United States Patent
Ha et al.

(10) Patent No.: US 9,340,671 B2
(45) Date of Patent: May 17, 2016

(54) LOW SHRINKAGE THERMOPLASTIC RESIN COMPOSITION AND MOLDED ARTICLE COMPRISING THE SAME

(71) Applicant: Cheil Industries Inc., Gumi-si (KR)

(72) Inventors: Dong In Ha, Uiwang-si (KR); Dong Min Park, Uiwang-si (KR); Seung Shik Shin, Uiwang-si (KR); Kyuong Sik Chin, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/308,834

(22) Filed: Jun. 19, 2014

(65) Prior Publication Data

US 2015/0005422 A1    Jan. 1, 2015

(30) Foreign Application Priority Data

Jun. 28, 2013 (KR) .................. 10-2013-0076078

(51) Int. Cl.
*C08K 3/34* (2006.01)
*C08K 5/52* (2006.01)
*C08L 69/00* (2006.01)

(52) U.S. Cl.
CPC ............. *C08L 69/00* (2013.01); *C08L 2201/02* (2013.01)

(58) Field of Classification Search
USPC ........................................................ 524/445
See application file for complete search history.

(56) References Cited

U.S. PATENT DOCUMENTS

| | | | | | |
|---|---|---|---|---|---|
| 4,487,881 | A | * | 12/1984 | Rawlings et al. | 524/504 |
| 5,139,817 | A | * | 8/1992 | Abe et al. | 427/558 |
| 5,162,433 | A | * | 11/1992 | Nishio et al. | 525/66 |
| 5,783,634 | A | * | 7/1998 | Weber | C08L 69/00 525/133 |
| 2003/0109650 | A1 | * | 6/2003 | Campbell et al. | 525/461 |

FOREIGN PATENT DOCUMENTS

| | | | | |
|---|---|---|---|---|
| JP | 05-117489 | A | | 5/1993 |
| JP | 05117489 | A | * | 5/1993 ............. C08L 51/06 |
| JP | 09-118811 | A | | 5/1997 |
| JP | 09118811 | A | * | 5/1997 ............. C08L 65/00 |
| KR | 10-0262887 | B1 | | 5/2000 |
| KR | 10-2007-0069347 | A | | 7/2007 |

OTHER PUBLICATIONS

European Search Report in counterpart European Application No. 14174359.1 dated Oct. 27, 2014, pp. 1-6.
Office Action in counterpart Korean Application No. 10-2013-0076078 dated Oct. 12, 2015, pp. 1-5.

* cited by examiner

*Primary Examiner* — Hui Chin
(74) *Attorney, Agent, or Firm* — Additon, Higgins & Pendleton, P.A.

(57) ABSTRACT

Disclosed herein are a thermoplastic resin composition and a molded article produced therefrom. The thermoplastic resin composition includes a thermoplastic resin, an inorganic filler, and a maleic anhydride (MAH)-grafted rubber, and has a coefficient of linear expansion from about $20 \times 10^{-6}$ cm/cm° C. to about $35 \times 10^{-6}$ cm/cm° C., as measured in accordance with ASTM D696. The thermoplastic resin composition can exhibit low shrinkage, excellent impact resistance and excellent flexural modulus and can have a good balance therebetween.

7 Claims, No Drawings

LOW SHRINKAGE THERMOPLASTIC RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2013-0076078, filed Jun. 28, 2013, the entire disclosure of which is incorporated herein by reference.

FIELD OF THE INVENTION

The present invention relates to a low shrinkage thermoplastic resin composition and a molded article comprising the same. More particularly, the present invention relates to a thermoplastic resin composition, which can exhibit low shrinkage, excellent impact resistance, excellent flexural modulus and also can exhibit a good balance therebetween, and a molded article comprising the same.

BACKGROUND

Thermoplastic resins can exhibit excellent physical properties, such as low specific gravity, good moldability, and good impact resistance, as compared with glass or metal. Recently, with the trend of producing low cost, larger and lighter weight electronics, plastic products made of thermoplastic resins are quickly replacing existing glass or metal-based products, thereby broadening application ranges of the thermoplastic resins to fields from electronics to automobile components. In line with this trend, functions as exterior materials and external appearance are increasingly important. In addition, there is a strong need for resins having good scratch resistance for ensuring stability from exterior shock or scratch or flame retardancy for ensuring stability against fire.

Among thermoplastic resins, polycarbonate (PC) resins exhibit excellent properties in terms of mechanical strength such as impact resistance and the like, flame retardancy, transparency, weather resistance, heat stability, and the like, and thus have been applied various fields such as office automation, materials for automobiles, construction materials, and the like. In particular, PC resins are spotlighted for use in housing materials, pedestals and the like for high-class home appliances, such as LCD and LED TVs, and the like, as a replacement for metal or glass. However, the polycarbonate resin has a drawback of very poor scratch resistance.

PC/ABS (acrylonitrile-butadiene-styrene) is a blend of a polycarbonate resin and an ABS resin, and is generally used as an exterior material for electronic products requiring high gloss, high fluidity, high impact resistance, and the like. However, since the PC/ABS has insufficient stiffness and flame retardancy when used alone, reinforced materials (thermoplastic resin compositions) obtained by adding inorganic fillers such as glass fibers and the like to PC/ABS have been developed.

However, since the inorganic fillers generally exhibit low compatibility with the thermoplastic resin and low adhesion thereto, the thermoplastic resin can exhibit deterioration in external appearance and may not exhibit improved properties in terms of stiffness, dimensional stability (low shrinkage), and the like.

Therefore, there is a need for a thermoplastic resin composition which can have improved properties such as low shrinkage, flexural modulus, and the like, while maintaining or improving impact resistance, when the inorganic fillers are added thereto.

SUMMARY

The present invention can provide a thermoplastic resin composition, which is environmentally friendly, exhibits low shrinkage, excellent impact resistance and excellent flexural modulus, and can have a good balance therebetween and excellent flame retardancy, and a molded article comprising the same.

In exemplary embodiments, the thermoplastic resin composition can include: a thermoplastic resin; an inorganic filler; and a maleic anhydride (MAH)-grafted rubber, wherein the thermoplastic resin composition has a coefficient of linear expansion from about $20 \times 10^{-6}$ cm/cm° C. to about $35 \times 10^{-6}$ cm/cm° C., as measured in accordance with ASTM D696.

In one embodiment, the inorganic filler may be present in an amount of about 1 part by weight to about 20 parts by weight, and the maleic anhydride (MAH)-grafted rubber may be present in an amount of about 1 part by weight to about 10 parts by weight, based on about 100 parts by weight of the thermoplastic resin.

In one embodiment, the thermoplastic resin may include at least one of polycarbonate, aromatic vinyl, polyamide, polyolefin, acrylic, and/or polyphenylene ether resins.

In one embodiment, the thermoplastic resin may include at least one of a polycarbonate resin and/or an aromatic vinyl resin.

In one embodiment, the thermoplastic resin may include about 10% by weight (wt %) to about 99 wt % of the polycarbonate resin, and about 1 wt % to about 90 wt % of the aromatic vinyl resin.

In one embodiment, the aromatic vinyl resin may be a rubber-modified aromatic vinyl resin including at least one of acrylonitrile-butadiene-styrene (ABS), acrylonitrile-ethylene propylene rubber-styrene (AES), and/or acrylonitrile-acrylic rubber-styrene (AAS) copolymers.

In one embodiment, the inorganic filler may include at least one of glass fibers, glass beads, glass flakes, talc, clay, kaolin, and/or mica.

In one embodiment, the maleic anhydride-grafted rubber may include at least one of maleic anhydride-grafted ethylene-propylene-diene monomer (MAH-g-EPDM), maleic anhydride-grafted polypropylene (MAH-g-PP), and/or maleic anhydride-grafted polyethylene (MAH-g-PE).

In one embodiment, the thermoplastic resin composition may further include a phosphorus flame retardant.

In one embodiment, the phosphorus flame retardant may be present in an amount of about 1 part by weight to about 25 parts by weight based on about 100 parts by weight of the thermoplastic resin.

In one embodiment, the thermoplastic resin composition may have an Izod impact strength from about 3 kgf·cm/cm to about 15 kgf·cm/cm, as measured on an about 3.2 mm thick specimen in accordance with ASTM D256, and may have a flexural modulus from about 25,000 kgf/cm² to about 60,000 kgf/cm², as measured on an about 6.4 mm thick specimen in accordance with ASTM D790.

The present invention also relates to a molded article produced from the thermoplastic resin composition.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to one embodiment of the invention, a thermoplastic resin composition may include (A) a thermoplastic resin, (B) an inorganic filler, and (C) a maleic anhydride (MAH)-grafted rubber, wherein the thermoplastic resin composition may have a coefficient of linear expansion from about $20 \times 10^{-6}$ cm/cm° C. to about $35 \times 10^{-6}$ cm/cm° C., as measured in accordance with ASTM D696.

(A) Thermoplastic Resin

The thermoplastic resin of the present invention may be any typical thermoplastic resin without limitation. Examples of the thermoplastic resin may include without limitation polycarbonate resins, aromatic vinyl resins, polyamide resins, polyolefin resins, acrylic resins, polyphenylene ether resins, and the like. These may be used alone or in combination thereof. In one embodiment, the thermoplastic resin may include a polycarbonate resin, an aromatic vinyl resin, or a mixture thereof.

Polycarbonate Resin

The polycarbonate resin is a thermoplastic polycarbonate resin, for example, an aromatic polycarbonate resin prepared by reacting phosgene, a halogen formate or a carbonate diester with one or more diphenols represented by Formula 1:

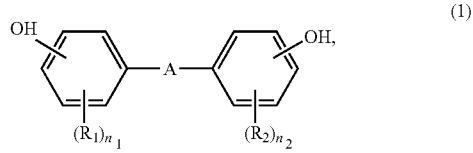

(1)

wherein A is a single bond, substituted or unsubstituted $C_1$ to $C_5$ alkylene, substituted or unsubstituted $C_1$ to $C_5$ alkylidene, substituted or unsubstituted $C_3$ to $C_6$ cycloalkylene, substituted or unsubstituted $C_5$ to $C_6$ cycloalkylidene, —CO—, —S—, or —SO$_2$—; $R_1$ and $R_2$ are the same or different and are each independently substituted or unsubstituted $C_1$ to $C_{30}$ alkyl or substituted or unsubstituted $C_6$ to $C_{30}$ aryl; and $n_1$ and $n_2$ are the same or different and are each independently an integer from 0 to 4.

As used here, the term "substituted" means that one or more hydrogen atoms is substituted with halogen, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, or a combination thereof. As used herein, "hetero" refers to one or more hydrogen atoms substituted with O, S, N, P and/or Si.

Examples of the diphenols may include without limitation 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures thereof. In exemplary embodiments, the diphenol can include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis(4-hydroxyphenyl)propane which is also referred to as bisphenol A.

The polycarbonate resin may be a branched polycarbonate resin, and may also be prepared by reacting diphenols with about 0.05 mol % to about 2 mol % of a polyfunctional compound containing tri- or higher functional groups, for example, tri- or higher-valent phenol groups, based on the total amount of the diphenols used in polymerization.

The polycarbonate resin may be used in the form of a homo-polycarbonate resin, a co-polycarbonate resin, or blends thereof.

In addition, the polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) from about 10,000 g/mol to about 40,000 g/mol as measured by GPC, without being limited thereto.

Further, the polycarbonate resin may have a melt index (MI) from about 5 g/10 min to about 200 g/10 min, for example, from about 10 g/10 min to about 120 g/10 min, as measured in accordance with ISO 1133 at about 250° C. under a load of about 10 kg. Furthermore, the polycarbonate resin may be a mixture of at least two polycarbonate resins having different melt indices.

In one embodiment, when the thermoplastic resin is a mixture of the polycarbonate resin and an aromatic vinyl resin, the thermoplastic resin mixture may include the polycarbonate resin in an amount of about 10 wt % to about 99 wt %, for example, about 50 wt % to about 95 wt %, and as another example about 90 wt % to about 95 wt %, based on 100 wt % of the thermoplastic resin mixture. In some embodiments, the thermoplastic resin mixture may include the polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate resin can be in a range from about any of the foregoing amounts to about any other of the foregoing amounts.

When the thermoplastic resin mixture includes the polycarbonate resin in an amount within this range, the thermoplastic resin composition can exhibit excellent impact resistance, heat resistance, and the like.

Aromatic Vinyl Resin

The aromatic vinyl resin may be, for example, a polymer of aromatic vinyl monomers (aromatic vinyl polymer resin), a copolymer of an aromatic vinyl monomer and another monomer copolymerizable with the aromatic vinyl monomer (aromatic vinyl copolymer), and/or a rubber-modified aromatic vinyl copolymer in which a rubbery polymer is dispersed in particle form in a matrix (continuous phase) including the aromatic vinyl (co)polymer.

In one embodiment, the rubber-modified aromatic vinyl copolymer may be polymerized by adding an aromatic vinyl monomer and optionally adding another monomer copolymerizable with the aromatic vinyl monomer to a rubbery polymer.

Generally, the rubber-modified aromatic vinyl copolymer may be prepared by any polymerization method known in the art, such as emulsion polymerization, suspension polymerization, and bulk polymerization. In addition, the rubber-modified aromatic vinyl copolymer may be typically prepared using a graft copolymer alone, or may be prepared using a mixture of a graft copolymer and the aromatic vinyl copolymer, for example, by mixing and extruding these two materials. Here, when the mixture of the graft copolymer and the aromatic vinyl copolymer is used, the two materials may be mixed in consideration of compatibility. Further, in bulk polymerization, the rubber-modified aromatic vinyl copolymer may be prepared through single-step reaction without separately preparing the graft copolymer and the aromatic vinyl copolymer. In either case, a rubber (rubbery polymer) may be present in an amount of about 5 wt % to about 50 wt % in the final rubber-modified aromatic vinyl copolymer. Furthermore, the rubber may have a z-average particle size from about 0.05 µm to about 6 µm. Within this range, the thermoplastic resin composition can exhibit excellent properties in terms of impact resistance, and the like.

In one embodiment, the graft copolymer may be obtained by graft copolymerization of a rubbery polymer, an aromatic vinyl monomer, and a monomer copolymerizable with the aromatic vinyl monomer, and may optionally further include a monomer for imparting processability and heat resistance, as needed.

Examples of the rubbery polymer may include without limitation diene rubbers such as polybutadiene, poly(styrene-butadiene), poly(acrylonitrile-butadiene), and the like; saturated rubbers obtained by adding hydrogen to the diene rubbers, isoprene rubbers, and the like; acrylic rubbers such as poly(butyl acrylate); ethylene-propylene-diene monomers (EPDM), and the like, and mixtures thereof. In exemplary embodiments, the rubbery polymer can be a diene rubber such as a butadiene rubber.

The rubbery polymer may be present in an amount of about 5 wt % to about 95 wt %, for example, about 10 wt % to about 90 wt %, and as another example about 40 wt % to about 90 wt %, based on the total weight (100 wt %) of the graft copolymer. Within this range, the thermoplastic resin composition can have good balance between excellent impact strength and mechanical properties.

The rubbery polymer (rubbery particles) may have an average (z-average) particle size from about 0.05 µm to about 6 µm, for example, from about 0.15 µm to about 4 µm, and as another example from about 0.25 µm to about 3.5 µm. Within this range, the thermoplastic resin composition can exhibit excellent impact strength and external appearance.

The aromatic vinyl monomer is an aromatic vinyl monomer capable of being grafted to the rubbery copolymer. Examples of the aromatic vinyl monomer capable of being grafted to the rubbery copolymer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures thereof. In exemplary embodiments, the aromatic vinyl monomer may be styrene.

The aromatic vinyl monomer may be present in an amount of about 5 wt % to about 90 wt %, for example, about 20 wt % to about 80 wt %, and as another example about 30 wt % to about 60 wt %, based on the total weight (100 wt %) of the graft copolymer. Within this range, the thermoplastic resin composition can have good balance between excellent impact strength and mechanical properties.

Examples of the monomer copolymerizable with the aromatic vinyl monomer may include without limitation vinyl cyanide compounds, such as acrylonitrile, methacrylonitrile, ethacrylonitrile, and the like. These monomers may be used alone or in combination thereof. The monomer copolymerizable with the aromatic vinyl monomer may be present in an amount of about 1 wt % to about 50 wt %, for example, about 5 wt % to about 45 wt %, and as another example about 10 wt % to about 30 wt %, based on the total weight (100 wt %) of the graft copolymer. Within this range, the thermoplastic resin composition can have good balance between excellent impact strength and mechanical properties.

Examples of the monomer for imparting processability and heat resistance may include without limitation acrylic acid, methacrylic acid, maleic anhydride, N-substituted maleimide, and the like, and mixtures thereof. The monomer for imparting processability and heat resistance is optionally present in an amount of about 15 wt % or less, for example, about 0.1 wt % to about 10 wt %, based on the total weight (100 wt %) of the graft copolymer. Within this range, the monomer can impart processability and heat resistance to the thermoplastic resin composition with minimal or no deterioration of other properties.

In one embodiment, the aromatic vinyl copolymer may be prepared using a mixture of the monomers, excluding the rubber (rubbery polymer) among components of the graft copolymer, and the ratio of the monomers may vary depending upon compatibility, and the like. For example, the aromatic vinyl copolymer may be obtained by copolymerization of the aromatic vinyl monomer and the monomer copolymerizable with the aromatic vinyl monomer.

The aromatic vinyl monomer may be present in an amount of about 50 wt % to about 95 wt %, for example, about 60 wt % to about 90 wt %, and as another example about 70 wt % to about 80 wt %, based on the total weight (100 wt %) of the aromatic vinyl copolymer. Within this range, the thermoplastic resin composition can have good balance between excellent impact strength and mechanical properties.

The monomer copolymerizable with the aromatic vinyl monomer may be present in an amount of about 5 wt % to about 50 wt %, for example, about 10 wt % to about 40 wt %, and as another example about 20 wt % to about 30 wt %, based on the total weight of the aromatic vinyl copolymer. Within this range, the thermoplastic resin composition can have good balance between excellent impact strength and mechanical properties.

In addition, the monomer for imparting processability and heat resistance may be present in an amount of about 30 wt % or less, for example, about 0.1 wt % to about 20 wt % based on the total weight (100 wt %) of the aromatic vinyl copolymer. Within this range, the monomer can impart processability and heat resistance to the thermoplastic resin composition without deterioration of other properties.

The aromatic vinyl resin may have a weight average molecular weight from about 10,000 g/mol to about 50,000 g/mol as measured by GPC, without being limited thereto.

Examples of the rubber-modified aromatic vinyl copolymer include without limitation acrylonitrile-butadiene-styrene (ABS), acrylonitrile-ethylene-propylene rubber-styrene (AES), acrylonitrile-acrylic rubber-styrene (AAS) copolymers, and the like, and mixtures thereof. As used here, in the ABS resin, a copolymer (g-ABS) obtained by grafting a styrene monomer, which is an aromatic vinyl compound, and an acrylonitrile monomer, which is an unsaturated nitrile compound, to a core butadiene rubbery polymer can be dispersed as the graft copolymer in a styrene-acrylonitrile copolymer (SAN) as the aromatic vinyl copolymer.

Further, in the rubber-modified aromatic vinyl copolymer, the graft copolymer may be present in an amount of about 10 wt % to about 100 wt %, for example, about 15 wt % to about 90 wt %, and the aromatic vinyl copolymer may be optionally present in an amount of about 90 wt % or less, for example, about 10 wt % to about 85 wt %, each based on the total weight (100 wt %) of the rubber-modified aromatic vinyl copolymer. Within this range, the thermoplastic resin composition can have good balance between excellent impact strength and mechanical properties.

In one embodiment, when the thermoplastic resin is a mixture of the polycarbonate resin and the aromatic vinyl resin, the thermoplastic resin mixture may include the aromatic vinyl resin in an amount of about 1 wt % to about 90 wt %, for example, about 5 wt % to about 50 wt %, and as another example about 5 wt % to about 10 wt %, based on the total weight (100 wt %) of the thermoplastic resin mixture. In some embodiments, the thermoplastic resin mixture may include the aromatic vinyl resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl resin can be in a range from about any of the foregoing amounts to about any other of the foregoing amounts.

Within this range, the thermoplastic resin composition can exhibit excellent impact resistance, heat resistance, and the like.

(B) Inorganic Filler

The inorganic filler of the present invention can improve properties of the thermoplastic resin composition, such as stiffness including flexural modulus and the like, dimensional stability, and the like. The inorganic filler may be any typical inorganic filler included in the thermoplastic resin composition without limitation. Examples of the inorganic filler may include without limitation glass fibers, glass beads, glass flakes, talc, clay, kaolin, mica, and the like, and mixtures thereof. In exemplary embodiments, the inorganic filler may be glass fibers, talc, or a mixture thereof.

The inorganic filler may be provided in the form of fibers, powdered particles, plates, and the like, without being limited thereto. For example, the inorganic filler may have an average particle diameter from about 1 μm to about 15 μm, for example, from about 10 μm to about 15 μm, and an average length from about 0.01 μm to about 10 μm, for example, from about 1 μm to about 5 μm.

In one embodiment, the inorganic filler may be coated with a coating material, for example, an epoxy resin, a urethane resin, a silane resin, and the like. A surface of the inorganic filler may be partially or entirely coated. For example, coating may be performed by spray coating of about 0.01 parts by weight to about 1.0 part by weight of the coating material based on about 100 parts by weight of the inorganic filler, without being limited thereto.

The thermoplastic resin composition may include the inorganic filler in an amount of about 1 part by weight to about 20 parts by weight, for example about 5 parts by weight to about 18 parts by weight, based on about 100 parts by weight of the thermoplastic resin. In some embodiments, the thermoplastic resin composition may include the inorganic filler in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the inorganic filler can be in a range from about any of the foregoing amounts to about any other of the foregoing amounts.

Within this range, the thermoplastic resin composition can exhibit excellent flexural modulus, impact resistance, dimensional stability (low shrinkage), and the like.

(C) Maleic Anhydride (MAH)-Grafted Rubber

The maleic anhydride (MAH)-grafted rubber of the present invention may be dispersed together with the inorganic filler in the thermoplastic resin (matrix), and can improve adhesion and compatibility between the thermoplastic resin and the inorganic filler. Thus, even though a small amount of the inorganic filler is used (for example, about 1 part by weight to about 20 parts by weight of the inorganic filler is used based on about 100 parts by weight of the thermoplastic resin) to minimize deterioration of the external appearance of the thermoplastic resin composition (molded article), and the like, the thermoplastic resin composition can exhibit and maintain improved properties in terms of low shrinkage, impact resistance, stiffness such as flexural modulus and the like, heat resistance, fluidity, and the like.

The maleic anhydride-grafted rubber may be any typical rubber (rubbery polymer) to which maleic anhydride is grafted. Examples of the maleic anhydride-grafted rubber may include without limitation maleic anhydride-grafted ethylene-propylene-diene monomer (MAH-g-EPDM), maleic anhydride-grafted polypropylene (MAH-g-PP), maleic anhydride-grafted polyethylene (MAH-g-PE), and the like, and mixtures thereof. In exemplary embodiments, the maleic anhydride-grafted rubber is MAH-g-EPDM.

The maleic anhydride-grafted rubber may be prepared by any method known in the art, for example, by kneading and extrusion of maleic anhydride and a rubbery polymer using an extruder at a temperature of about 190° C. to about 250° C.

In one embodiment, the maleic anhydride-grafted rubber may include about 0.1 wt % to about 5 wt % of the maleic anhydride and about 95 wt % to about 99.9 wt % of the rubber (rubbery polymer), without being limited thereto.

In some embodiments, the maleic anhydride-grafted rubber may include the maleic anhydride in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the maleic anhydride can be in a range from about any of the foregoing amounts to about any other of the foregoing amounts.

The thermoplastic resin composition may include the maleic anhydride-grafted rubber in an amount of about 1 part by weight to about 10 parts by weight, for example, about 1 part by weight to about 7 parts by weight, and as another example about 2 parts by weight to about 5 parts by weight, based on about 100 parts by weight of the thermoplastic resin. In some embodiments, the thermoplastic resin composition may include the maleic anhydride-grafted rubber in an amount of about 1, 2, 3, 4, 5, 6, 7, 8, 9, or 10 parts by weight. Further, according to some embodiments of the present invention, the amount of the maleic anhydride-grafted rubber can be in a range from about any of the foregoing amounts to about any other of the foregoing amounts.

Within this range, the maleic anhydride (MAH)-grafted rubber can improve adhesion and compatibility between the thermoplastic resin and the inorganic filler, and the thermoplastic resin composition can exhibit excellent properties in terms of flexural modulus, impact resistance, dimensional stability (low shrinkage), and the like.

The thermoplastic resin composition of the present invention may further include a phosphorus flame retardant to exhibit improved flame retardancy and eco-friendliness. The phosphorus flame retardant refers to any typical flame retardants containing phosphorus. Examples of the phosphorus flame retardant may include red phosphorus, phosphates, phosphonates, phosphinates, phosphine oxide, phosphazenes, metallic salts thereof, and the like, and mixtures thereof, without being limited thereto.

The flame retardant may be present in an amount of about 1 part by weight to about 25 parts by weight, for example, about 10 parts by weight to about 20 parts by weight, based on about 100 parts by weight of the thermoplastic resin. Within this range, the thermoplastic resin composition can exhibit excellent flame retardancy with minimal or no deterioration of other properties.

The thermoplastic resin composition of the present invention may further include at least one of typical additives, such as impact modifiers, anti-dripping agents, antibacterial agents, heat stabilizers, antioxidants, release agents, photostabilizers, surfactants, plasticizers, lubricants, antistatic agents, colorants including dyes and/or pigments, flame retardant aids, and the like, and mixtures thereof, as needed.

The thermoplastic resin composition of the present invention may have a coefficient of linear expansion (coefficient of linear thermal expansion (CLTE)) of about $35 \times 10^{-6}$ cm/cm° C. or less, for example, from about $20 \times 10^{-6}$ cm/cm° C. to about $35 \times 10^{-6}$ cm/cm° C., and as another example from about $22 \times 10^{-6}$ cm/cm° C. to about $34 \times 10^{-6}$ cm/cm° C., as measured in accordance with ASTM D696. A lower coefficient of linear expansion indicates lower shrinkage of the thermoplastic resin composition. If the coefficient of linear expansion is greater than about $35 \times 10^{-6}$ cm/cm° C., the thermoplastic resin composition can exhibit significant deviation between shrinkage and expansion according to temperature.

In addition, the thermoplastic resin composition may have an Izod impact strength from about 3 kgf·cm/cm to about 15 kgf·cm/cm, for example, about 3 kgf·cm/cm to about 10 kgf·cm/cm, as measured on an about 3.2 mm thick specimen in accordance with ASTM D256, and may have a flexural modulus from about 25,000 kgf/cm$^2$ to about 60,000 kgf/cm$^2$, for example, from about 43,000 kgf/cm$^2$ to about 60,000 kgf/cm$^2$, as measured on an about 6.4 mm thick specimen in accordance with ASTM D790. Within this range, the thermoplastic resin composition can exhibit low shrinkage, excellent impact resistance, excellent flexural modulus, and good balance therebetween.

Further, the thermoplastic resin composition may have a flame retardancy level of V–0 or higher, as measured on an about 1.5 mm thick specimen according to the UL-94 vertical flammability test method.

The thermoplastic resin composition of the present invention may be prepared into pellets by simultaneously mixing the aforementioned components and other optional additives, followed by melt-extrusion in an extruder. The prepared pellets may be formed into various molded articles (products) through various molding methods, such as injection molding, extrusion, vacuum molding, cast molding, and the like.

According to one embodiment of the invention, a molded article may be produced from the thermoplastic resin composition. Since the molded article can exhibit low shrinkage and excellent properties in terms of stiffness, impact resistance, heat resistance, flame retardancy and the like, the molded article can be broadly applied to components of electronics, exterior materials, automobile components, miscellaneous goods, structural materials, and the like. In particular, the molded article can be useful as plastic members of television housings, pedestals, metal substitutes, and the like.

Next, the present invention will be described in more detail with reference to the following examples. It should be understood that these examples are provided for illustration only and are not to be in any way construed as limiting the present invention.

Examples

Details of components used in Examples and Comparative Examples are as follows:

(A) Thermoplastic Resin (A1) PC-1: A polycarbonate resin (SC-1090, Cheil Industries Inc.) having a melt index of 30±3.0 g/10 min is used (the melt index was measured in accordance with ISO 1133 at 250° C. under a load of 10 kg).

(A2) PC-2: A polycarbonate resin (SC-1620, Cheil Industries Inc.) having a melt index of 100±10 g/10 min is used (the melt index was measured in accordance with ISO 1133 at 250° C. under a load of 10 kg).

(A3) g-ABS: An aromatic vinyl resin (g-ABS, CHPC, Cheil Industries Inc.), in which an acrylonitrile-styrene copolymer having a weight ratio of styrene monomer to acrylonitrile (SM/AN) of 73/27 is grafted to 48 wt % of a polybutadiene rubber (PBR) having a z-average particle size of 310 nm, is used.

(B) Inorganic Filler

A glass fiber (415A, Owens Corning Co., Ltd.) is used.

(C) Maleic Anhydride (MAH)-Grafted Rubber (C1) MAH-g-EPDM: A maleic anhydride-grafted ethylene-propylene-diene monomer (MAH-g-EPDM, KEPA1150, Kumho Polychem Co., Ltd.) is used.

(C2) MAH-g-EPDM: A maleic anhydride-grafted ethylene-propylene-diene monomer (MAH-g-EPDM, VA1803, Exxon Mobil Co., Ltd.) is used.

(D) Rubbery Polymer

In Comparative Examples, ethylene-propylene-diene monomer (EPDM, KEP070P, Kumho Polychem Co., Ltd.), to which maleic anhydride is not grafted, is used.

(E) Phosphorus Flame Retardant

Bisphenol-A diphosphate (BDP, Yoke Chemical Co., Ltd.) is used.

Examples 1 to 4 and Comparative Examples 1 to 5

According to compositions as listed in Table 1, a polycarbonate resin and an aromatic vinyl resin, as a thermoplastic resin, an inorganic filler, a maleic anhydride (MAH)-grafted rubber, a rubbery polymer, and a phosphorus flame retardant are introduced into a 36 L/D twin-screw type extruder having a diameter of 45 mm, followed by kneading and extrusion at 250° C., thereby preparing thermoplastic resin compositions in pellet form.

The prepared pellets are dried at 80° C. for 4 hours, followed by preparing specimens at a molding temperature from 250° C. to 280° C. and at a mold temperature from 60° C. to 150° C. using a 6 oz injection machine. The prepared specimens are evaluated as to the following properties, and results are shown in Table 1.

Property Evaluation (1) Izod impact strength: Izod impact strength is measured on 3.2 mm thick notched Izod specimens in accordance with ASTM D256 (unit: kgf·cm/cm).

(2) Flexural modulus: Flexural modulus is measured on 6.4 mm thick specimens in accordance with ASTM D790 (unit: kgf/cm$^2$)

(3) Flame retardancy: Flame retardancy is measured on 1.5 mm thick specimens according to the UL-94 vertical flammability test method.

(4) Coefficient of linear expansion: Coefficient of linear expansion is measured on specimens prepared by cutting flexural specimens in accordance with ASTM D696 (unit: $\times 10^{-6}$ cm/cm° C.).

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| (A) | (A1) (wt %) | 25 | 50 | 75 | 95 | 25 | 50 | 75 | 95 | 25 |
| | (A2) (wt %) | 75 | 50 | 25 | 0 | 75 | 50 | 25 | 0 | 75 |
| | (A3) (wt %) | — | — | — | 5 | — | — | — | 5 | — |
| (B) (parts by weight) | | 17 | 17 | 17 | 17 | 17 | 17 | 17 | 17 | — |
| (C) | (C1) (parts by weight) | 5 | — | 2.5 | 2.5 | — | — | — | — | — |
| | (C2) (parts by weight) | — | 5 | 2.5 | 2.5 | — | — | — | — | — |
| (D) (parts by weight) | | — | — | — | — | 5 | 5 | 5 | 5 | 5 |
| (E) (parts by weight) | | 14 | 14 | 14 | 14 | 14 | 14 | 14 | 14 | 14 |
| Izod impact strength | | 7.5 | 7.3 | 7.4 | 6.8 | 6.2 | 6.2 | 6.2 | 6.7 | 7.4 |
| Flexural modulus | | 46120 | 45321 | 43590 | 43085 | 43225 | 44102 | 44922 | 44999 | 23211 |
| Flame retardancy | | V0 | V0 | V0 | V0 | V0 | V0 | V0 | V0 | V0 |
| Coefficient of linear expansion | | 28.1 | 29.0 | 30.5 | 32.5 | 46.2 | 40.5 | 39.5 | 39.1 | 89.1 |

(Parts by weight: parts by weight based on 100 parts by weight of the (A) thermoplastic resin)

From the results of Table 1, it can be seen that the thermoplastic resin compositions of Examples 1 to 4 exhibit excellent properties in terms of coefficient of linear expansion (low shrinkage), flexural modulus (stiffness), impact resistance and flame retardancy, and had good balance therebetween.

Conversely, it can be seen that the thermoplastic resin composition of Comparative Example 5, which did not use the inorganic filler and the maleic anhydride (MAH)-grafted rubber, exhibits deteriorated coefficient of linear expansion and flexural modulus. In addition, it can be seen that the thermoplastic resin compositions of Comparative Examples 1 to 4, which use a general rubbery polymer instead of the maleic anhydride (MAH)-grafted rubber, did not exhibit low shrinkage due to deterioration in coefficient of linear expansion thereof.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A thermoplastic resin composition comprising:
a thermoplastic resin comprising about 10 wt % to about 99 wt % of polycarbonate resin and about 1 wt % to about 90 wt % of aromatic vinyl resin;
an inorganic filler; and
a maleic anhydride (MAH)-grafted rubber,
wherein the thermoplastic resin composition has a coefficient of linear expansion from about $20 \times 10^{-6}$ cm/cm° C. to about $35 \times 10^{-6}$ cm/cm° C., as measured in accordance with ASTM D696,
wherein the composition comprises the inorganic filler in an amount of about 1 part by weight to about 20 parts by weight and the maleic anhydride-grafted rubber in an amount of about 1 part by weight to about 10 parts by weight, each based on about 100 parts by weight of the thermoplastic resin, and
wherein the aromatic vinyl resin is a rubber-modified aromatic vinyl copolymer comprising at least one of acrylonitrile-butadiene-styrene (ABS), acrylonitrile-ethylene propylene rubber-styrene (AES), and acrylonitrile-acrylic rubber-styrene (AAS) copolymers.

2. The thermoplastic resin composition according to claim 1, wherein the inorganic filler comprises at least one of glass fibers, glass beads, glass flakes, talc, clay, kaolin, and mica.

3. The thermoplastic resin composition according to claim 1, wherein the maleic anhydride-grafted rubber comprises at least one of maleic anhydride-grafted ethylene-propylene-diene monomer (MAH-g-EPDM), maleic anhydride-grafted polypropylene (MAH-g-PP), and maleic anhydride-grafted polyethylene (MAH-g-PE).

4. The thermoplastic resin composition according to claim 1, further comprising a phosphorus flame retardant.

5. The thermoplastic resin composition according to claim 4, comprising the phosphorus flame retardant in an amount of about 1 part by weight to about 25 parts by weight based on about 100 parts by weight of the thermoplastic resin.

6. The thermoplastic resin composition according to claim 1, wherein the thermoplastic resin composition has an Izod impact strength from about 3 kgf·cm/cm to about 15 kgf·cm/cm, as measured on an about 3.2 mm thick specimen in accordance with ASTM D256, and has a flexural modulus from about 25,000 kgf/cm$^2$ to about 60,000 kgf/cm$^2$, as measured on an about 6.4 mm thick specimen in accordance with ASTM D790.

7. A molded article produced from the thermoplastic resin composition according to claim 1.

* * * * *